Patented June 30, 1931

1,812,238

UNITED STATES PATENT OFFICE

FRITZ HAMMER, OF HESSEN-NASSAU, GERMANY, ASSIGNOR TO THE FIRM B. BRAUN, OF MELSUNGEN (HESSEN-NASSAU), GERMANY

PROCESS FOR PREPARING COMPRESSED IODINE IN THE FORM OF RODS, PENCILS OR THE LIKE

No Drawing. Application filed October 17, 1929, Serial No. 400,462, and in Germany April 18, 1929.

This invention relates to a process for preparing compressed rods or pencils from iodine.

There is a demand for such iodine pencils or rods, as an easy and readily handled means of applying the iodine to the skin of the human or animal body.

Considerable difficulties, however, stand in the way of compressing iodine into the desired shape.

According to this invention these difficulties are overcome by first obtaining a solution of iodine, which, in itself is only slightly soluble in water. The volatility of the iodine, which is appreciable even at ordinary temperature, is then lowered, as only in this way can a pencil, which is durable for any length of time, be obtained.

The dissolving of the crystalline iodine is effected by the addition of an iodine compound, preferably potassium iodide, and small quantities of water. The resulting mass is converted into a paste, which lowers the volatility of the iodine contained therein, by the addition of suitable binding agents such as kaolin and a large proportion of milk sugar. The last mentioned admixture is particularly valuable, because it is also water-soluble and because it is particularly suitable for compression. These plastic masses are then dried at low temperature, powdered, mixed with sufficient quantities of talc and compressed into pencils or rods.

The following is an example of suitable proportions of ingredients for making an iodine rod or pencil according to the process of this invention.

| | |
|---|---|
| Pure iodine | 75,0 |
| Potassium iodide | 75,0 |
| Bolus or kaolin | 25,0 |
| Milk sugar | 100,0 |
| Talc | 13,75 |

What I claim is:

1. A process for preparing compressed iodine in shaped form, comprising the steps of dissolving the iodine in an aqueous solution of an alkali metal iodide, mixing the resulting solution into a paste with at least one binding agent for reducing the volatility of the iodine and compressing the paste into the desired form.

2. A process for preparing compressed iodine in shaped forms such as rods, pencils and the like, comprising the steps of dissolving the iodine in an aqueous solution of at least one alkali metal iodide, mixing the resulting solution into a paste with at least one binding agent for reducing the volatility of the iodine and compressing the paste into the form of a pencil.

3. A process as claimed in claim 2, wherein the iodine is rubbed in contact with at least one alkali metal iodide and a small quantity of water.

4. A process as claimed in claim 2, wherein the iodine is rubbed in contact with potassium iodide and a small quantity of water.

5. A process as claimed in claim 2, wherein the binding agents added are such as render the iodine plastic and at the same time maintain the solubility of the iodine in the aqueous solution of at least one alkali metal.

6. A process as claimed in claim 2, wherein the iodine is rubbed in contact with at least one alkali metal iodide and a small quantity of water and the binding agent consists of china clay together with a large proportion of milk sugar.

7. A process as claimed in claim 2, wherein the iodine is rubbed in contact with potassium iodide and a small quantity of water and the binding agent consists of china clay together with a large proportion of milk sugar.

8. A process as claimed in claim 2, wherein the plastic mass is dried at a low temperature, powdered, mixed with water and then compressed.

9. As a new article of manufacture, compressed shaped bodies of iodine bound with binding agents.

10. As a new article of manufacture compressed shaped bodies of iodine bound together with earths and milk sugar.

11. As a new article of manufacture compressed shaped bodies of iodine bound together with china clay and milk sugar.

12. As new articles of manufacture, compressed shaped bodies composed of 75 parts of iodine, 75 parts of potassium iodide, 25 parts of kaolin, 100 parts of milk sugar and 13.75 parts of talc.

13. As new articles of manufacture, compressed shaped pencils or rods composed of 75 parts of iodine, 75 parts of potassium iodide, 25 parts of kaolin, 100 parts of milk sugar and 13.75 parts of talc.

In testimony whereof I hereunto affix my signature this 4th day of October 1929.

Dr. FRITZ HAMMER.